United States Patent
Jang

(10) Patent No.: US 6,437,884 B1
(45) Date of Patent: Aug. 20, 2002

(54) APPARATUS FOR SCANNING A WRITTEN OR PRINTED MATTER

(75) Inventor: Heung-Gyu Jang, Suwon (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 07/981,126

(22) Filed: Nov. 24, 1992

(51) Int. Cl.$^7$ ................................................. H04N 1/04
(52) U.S. Cl. ...................................... 358/474; 358/461
(58) Field of Search ............................. 358/400, 401, 358/461, 474, 496, 818; 355/214

(56) References Cited

U.S. PATENT DOCUMENTS

| | | | |
|---|---|---|---|
| 4,602,293 A | * | 7/1986 | Sekine ........................ 358/461 |
| 4,860,059 A | * | 8/1989 | Terashita ..................... 355/214 |
| 4,970,606 A | * | 11/1990 | Shima ......................... 358/474 |
| 5,132,588 A | * | 7/1992 | Warman ....................... 348/818 |

FOREIGN PATENT DOCUMENTS

JP 60154769 * 8/1985 ................. 358/461

\* cited by examiner

*Primary Examiner*—Thomas D. Lee
(74) *Attorney, Agent, or Firm*—Robert E. Bushnell, Esq.

(57) ABSTRACT

An apparatus for scanning a matter in a document scanner such as a facsimile machine, includes a passage through which said written or printed matter is transferred, a scanning plate with a reference scanning surface positioned over said passage means, and an adhesive scanning tape having a reference color adhered to said reference "scanning surface. The adhesive scanning tape is readily detachable from the screen scanning surface.

20 Claims, 3 Drawing Sheets

APPARATUS FOR SCANNING A WRITTEN OR PRINTED MATTER

TECHNICAL FIELD

The present invention relates to apparatus for scanning a sheet bearing contrasting scannable written or printed information (hereinafter sometimes simply referred to as a "sheet"), and more particularly, to means and a process for keeping a reference scanning surface of the device clean.

BACKGROUND ART

Conventional designs of apparatus such as facsimile transmission units (i.e., a "FAX") and document or page readers, for scanning sheets (e.g., scannable matter) bearing contrasting written or printed matter, generally include a passage through which scannable matter is transported by means of transfer rolls, past a scanning plate with a reference scanning surface positioned over the passage while a light source projects a light beam upon either the reference scanning surface or on any intervening sheet of scannable matter. The light beam reflected from the reference scanning surface is delivered to the photoelectric conversion device and is converted into an electric signal that is stored in a memory device as a reference value. Scanned image information created by reflection of the light beam from a moving sheet is converted into an electric signal and compared with the reference value stored in the memory device to determine brightness of the image information in relation to the reference value.

In such a conventional apparatus however, the reference scanning surface is coated with paint having a reference color, for example, a white color, which is similar to the color of a sheet of scannable matter to be scanned. The paint with the reference color is typically produced by mixing many colors under a specific surrounding condition. Therefore, it is very difficult to always make the same reference color under different color mixing conditions. Moreover, the sheet itself varies in composition and color, depending upon the paper mill, process and esthetic considerations attendant upon its manufacture. Hence, it is very difficult to effectively control the scanning quality of the apparatus. Moreover, when a reference scanning surface that has been contaminated through prolonged use, and is cleaned by using a cleanser, the coated paint deteriorates or even peels off from the underlying surface of the apparatus.

SUMMARY OF THE INVENTION

It is therefore an object of the present invention to provide an improved apparatus and process for scanning sheets bearing information.

It is another object to provide means for easily enabling maintenance of the cleanliness of a reference scanning surface.

It is yet another object to provide an improved reference surface in a device for scanning media bearing contrasting written or printed information.

It is still another object to provide an easily replaceable reference surface in a device for scanning media bearing contrasting written or printed information.

It is a further object to provide a reference surface enabling quick and inexpensive restoration of its surface characteristics in a device for scanning media bearing contrasting written or printed information.

These and other object can be achieved according to the present invention, with an apparatus for scanning media bearing written or printed information, using apparatus that has passages through which the written or printed sheet is transported, a scanning plate with a reference scanning surface positioned over the passage and exposed to a beam of light, and a removable scanning surface having a reference color positioned between the beam of light and the reference scanning surface. The removable scanning surface may be an adhesive, scanning tape that is readily detachable from the reference scanning surface so as to enable its replacement with a fresh one when the adhesive scanning tape is discolored or contaminated from prolonged use.

The present invention will be more specifically described with reference to the drawings attached only by of example.

BRIEF DESCRIPTION OF THE ATTACHED DRAWINGS

A more complete appreciation of this invention, and many of the attendant advantages thereof, will be readily apparent as the same becomes better understood by reference to the following detailed description when considered in conjunction with the accompanying drawings in which like numbers indicate the same or similar numbers, and wherein.

DETAILED DESCRIPTION OF A CERTAIN PREFERRED EMBODIMENT

Figure 1:
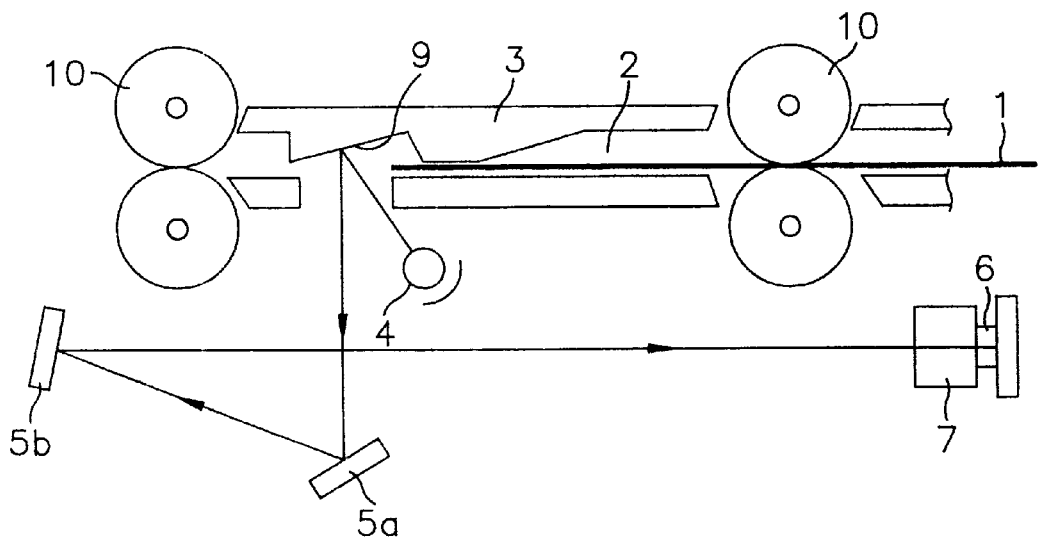
FIG. 1 is a schematic diagram of a conventional scanning apparatus in a facsimile machine.

Tuning now to the drawings, FIG. 1 shows as item of information in the form of a sheet 1 of written or printed medium bearing contrasting written or printed information from sheet 1, which apparatus and apparatus for scanning that information generally includes a passage 2 through which sheet 1 is transferred by means of transfer rolls 10, a scanning plate 3 with a reference scanning surface 9 positioned over the passage 2, a light source 4 for projecting a light beam on the reference scanning surface 9 or on the matter 1, reflectors 5a, 5b, a lens 7, and a photoelectric conversion device 6.

In operation, when the sheet of information 1 begins to be guided through the passage 2, a sensor (not shown) detects the presence in the facsimile of sheet 1 allows light source 4 to project the light beam onto the reference scanning surface 9. Then, the light beam is reflected onto the reference scanning surface 9 and is transferred to the photoelectric conversion device 6 by way of the reflectors 5a, 5b and the lens 7. In similar to the conventional apparatus, the light beam is delivered to the photoelectric conversion device 6 and is converted to an electric signal and stored into a memory device (not shown) as a reference value.

If the sheet 1 is moved across reference scanning surface 9, image information formed on the sheet 1 is scanned by the light beam generated from the light source 4 and transferred to the photoelectric conversion device 6 by way of reflectors 5a, 5b and lens 7. The scanned image information is converted into an electric signal by the photoelectric conversion device 6 and compared with the reference value stored in the memory device to determine brightness of the image information in relation to the reference value.

In such a conventional apparatus, the reference scanning surface 9 of the scanning plate 3 is finished with a coating of a layer of paint having a reference color, as for example, a white color which is similar to sheet matter 1. The paint with the reference color is usually produced by mixing many colors under a specific surrounding condition. Therefore, it is very difficult to always make the same reference color under different color mixing conditions. Hence, it is very difficult to effectively control the scanning quality of the apparatus. Moreover, when the reference scanning surface that has been contaminated through long use is cleaned by using as a cleanser, the coated paint degrades or even peels off from the reference scanning surface.

Figure 2:
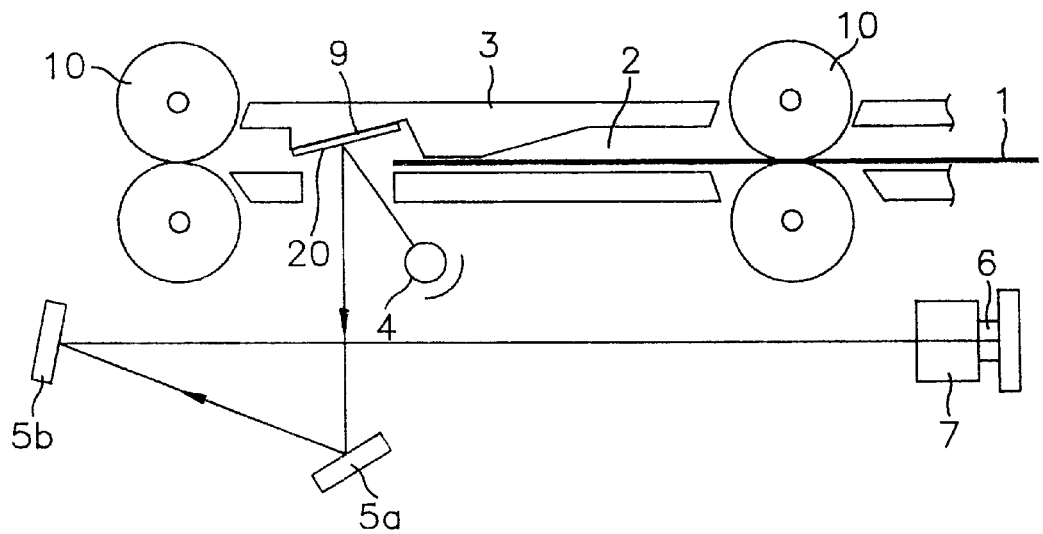
FIG. 2 is a schematic diagram of a scanning apparatus in a facsimile machine with an adhesive scanning tape adhered to the reference scanning surface according to the present invention.
Figure 3:
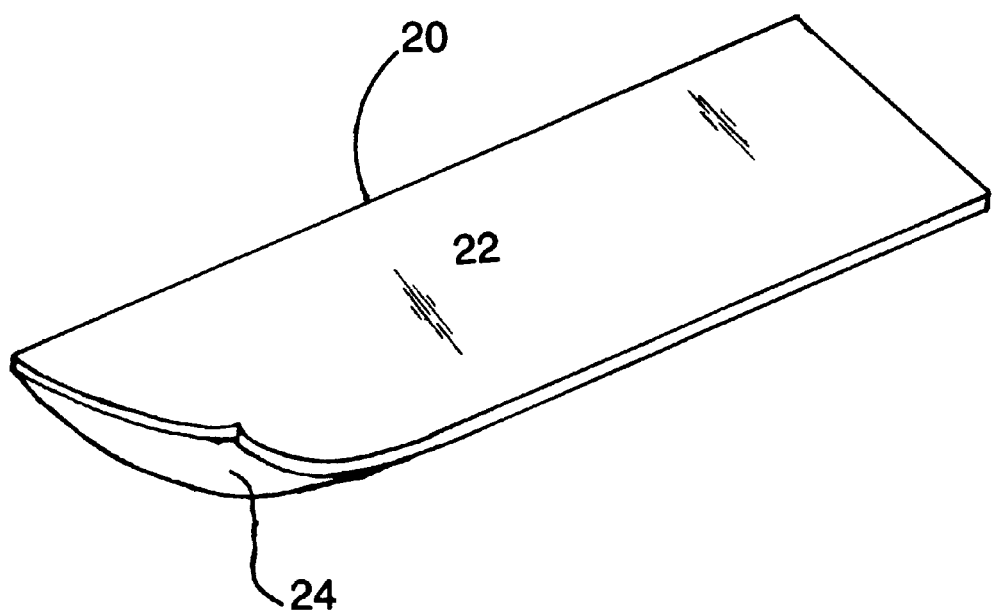
FIG. 3 is an oblique projection of a representative scanning tape constructed according to the principles of the present invention.

Turning now to FIGS. 2 and 3, a schematic plate 3 is positioned over a passage 2 through which sheet 1 is transported and has a reference scanning surface 9 to which is adhesively attached a removable replaceable and adhesive scanning tape 20 having a one major surface 22 exhibiting reference color, for example, a white color which is similar in color, shade, texture and reflectivity to the surface of a sheet 1 that contains no printed or written information. It should be noted that the adhesive power of a coating of an adhesive 24 on a second major surface of the adhesive scanning tape 20 should be made relatively weak (i.e., permanently tacky), and not so strong, so as to be readily detachable, if and whenever desired, from the reference scanning surface 9.

In operation, when a sheet 1 of a medium begins to be transported through the passage 2, a sensor (not shown) detects the presence of the sheet and allows the light source 4 to project a light beam upon the adhesive scanning tape 20 adhering to the reference scanning surface 9. Then, the light beam is reflected from the adhesive scanning tape 20 and transferred to the photoelectric conversion device 6 by way of the reflectors 5a, 5b and lens 7. In a manner similar to the conventional apparatus, the light beam delivered to the photoelectric conversion device 6 is converted to an electric signal and stored into a memory device (not shown) as a reference value.

If the sheet is transported past adhesive scanning surface 20, written or printed indicia of information formed on sheet 1 is scanned by the light beam generated from the light source 4 and transferred to the photoelectric conversion device 6 by way of reflectors 5a, 5b and lens 7. The scanned image information is converted into an electric signal by the photoelectric conversion device 6 and compared with the reference value stored in the memory device in order to determine brightness of the image information in relation to the reference value.

It can therefore be readily appreciated that when discolored or contaminated by long use, the adhesive scanning tape 20 may be cleaned or easily replaced by a fresh one because it adheres to the reference scanning surface by means of, for example, an adhesive. Ideally, the underside of the scanning surface is coated with a layer of adhesive 24 that remains permanently tacky. A non-volatile plasticizer for example may be included in the adhesive, in order to maintain tackiness, and thus removability regardless of length of time since application to surface 9. Hence the apparatus according to the present invention provides means for easily maintaining the quality of the reference scanning surface.

Figure 4:
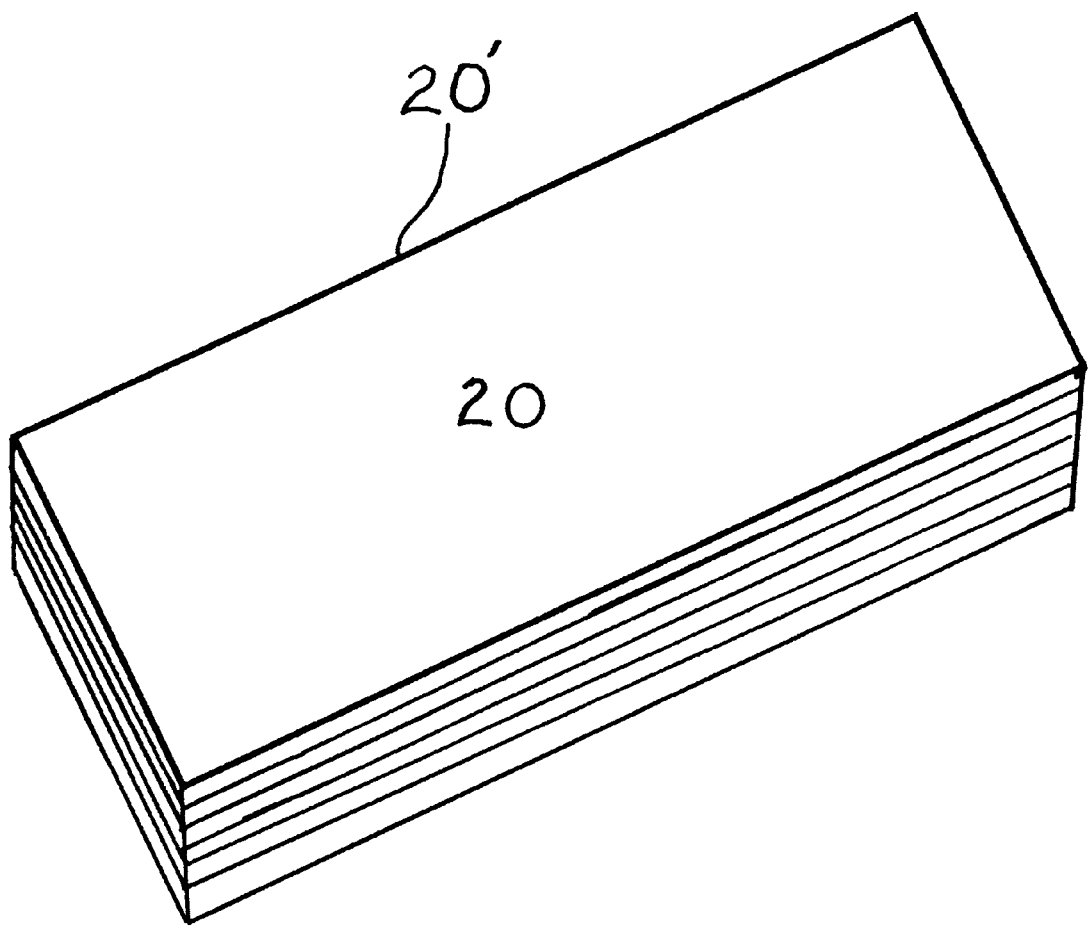
FIG. 4 is an illustration of a pad formed by a plurality of strips of scanning tape stacked together.

While the invention has been particularly shown and described with reference to a preferred embodiment, it will be understood by those skilled in the art that modifications in detail may be made without departing from the spirit and scope of the invention. By way of example, two or several layers of adhesive scanning tape (see FIG. 4), sufficiently thin to maintain the focus of lens 7, may be assembled into a pad 20' attached, as for example, by a tacky adhesive, to the underlying support surface 9, and each successive layer 20 of the pad may be individually peeled off as the characteristics (e.g., cleanliness) of the exposed outer surface of each layer deteriorates. Ultimately, the entire pad may be replaced after the last scanning surface 20 in the pad is removed. Alternatively, the pad may be stored outside of the apparatus and single strips 20 may be removed from the pad and adhesively attached to scanning surface 9. The scanning tape 20 may be transparent and backed with the adhesive layer, to efficiently serve as a readily detachable gradation of reference scanning surface 9. As scanning tape 20 deteriorates through usage and wear,it may be readily manually removed due to the continued tackiness of its adhesive backing layer and another scanning tape 20 substituted. Alternatively, scanning tapes 20 may be made opaque, with different surface texture, color and tint, to both serve as a substitute for reference scanning surface 9, and to match the surface texture, color and tint of sheets 1 expected to be transported through passage 2.

These and other modifications will be readily apparent to those of ordinary sill in the art, are defined in the following claims.

What is claimed is:

1. An apparatus for scanning written or printed matter, comprising:
   a reference scanning surface, positioned opposite from a source of light, to reflect light emitted from said source of light;
   a strip removably attached to said reference scanning surface, said strip exhibiting a reference characteristic for effecting reflection of said light; and
   a passage for transporting media bearing indicia of information between said source of light and said strip, further comprised of said strip being transparent to said light for slightly changing a characteristic of said light.

2. The apparatus of claim 1, further comprised of said strip comprising:
   an elongate length of material having one major surface providing said reference characteristic; and
   a layer of a continuously tacky adhesive disposed upon a second major surface of said elongate length of material, said second major surface being opposite said one major surface.

3. The apparatus of claim 2, further comprised of said adhesive being transparent to said light.

4. The apparatus of claim 2, further comprised of the media having surface properties contrasting with said indicia of information, and said reference characteristic being comparable to said surface properties.

5. The apparatus of claim 1, further comprised of the media having surface properties contrasting with said indicia of information, and said strip comprised of said reference characteristic being comparable to said surface properties.

6. The apparatus of claim 1, comprising:
   a source of said light separated by said passage means from said reference scanning surface; and
   means for conveying written and printed matter along said passage means and between said reference scanning surface and said source;
   said reference scanning surface maintaining said strip in a position that is constantly exposed to illumination by said light absent interjection by said conveying means of the written and printed matter between said strip and said source.

7. An apparatus for scanning written or printed matter, comprising:

a reference scanning surface, positioned opposite from a source of light, to reflect light emitted from said source of light;

a strip removably attached to said reference scanning surface, said strip exhibiting a reference characteristic for effecting reflection of said light; and a passage for transporting media bearing indicia of information between said source of light and said strip, further comprised of said strip comprising:

a plurality of elongate lengths of material arranged in a stacked array, each of said elongate lengths comprising:

one major surface providing said reference characteristic, and a layer of a continuously tacky adhesive disposed upon a second major surface of said elongate length.

8. The apparatus of claim 7, further comprised of said material and said adhesive being transparent to said light for slightly changing a characteristic of said light.

9. The apparatus of claim 7, further comprised of the media having surface properties contrasting with said indicia of information, and said reference characteristic being comparable to said surface properties.

10. A process for scanning written or printed matter, comprising:

illuminating a source of light;

providing a reference scanning surface, positioned opposite from said source of light, to reflect light emitted from said source of light;

removably attaching to said reference scanning surface, a strip exhibiting a reference characteristic for effecting reflection of said light;

transporting media bearing indicia of information between said source of light and said strip; and periodically replacing said strip.

11. The process of claim 10, further comprised of said strip comprising:

an elongate length of material having one major surface providing said reference characteristic; and a layer of a continuously tacky adhesive disposed upon a second major surface of said elongate length of material, said second major surface being opposite said one major surface.

12. The process of claim 10, comprising:

constantly positioning said strip with said reference scanning surface continuously exposed to illumination by said light absent interjection of the media between said light and said strip during said transporting of the media.

13. A process for scanning written or printed matter, comprising:

providing a source of light;

positioning a reference scanning surface opposite from said source of light to reflect light emitted from said source of light;

forming a passage accommodating transportation of media bearing indicia of information between said source of light and said reference scanning surface;

removably attaching to said reference scanning surface, a strip exhibiting a reference characteristic for effecting reflection of said light; and periodically replacing said strip.

14. The process of claim 13, further comprised of:

illuminating said strip with said light, and transporting media bearing indicia of information between said source of light and said strip.

15. The process of claim 13, comprising:

maintaining said strip during said scanning, with said reference scanning surface continuously exposed to illumination by light emitted from said source, absent interjection during said transportation, of the media between said light and said strips.

16. An apparatus for scanning written or printed matter, comprising:

a reference scanning surface, positioned opposite from a source of light, to reflect light emitted from said source of light;

a strip removably attached to said reference scanning surface, said strip exhibiting a reference characteristic for effecting reflection of said light; and a passage for transporting media bearing indicia of information between said source of light and said strip, said strip comprising a plurality of elongate lengths of material arranged in a stacked array, each of said elongate lengths comprising:

one major surface providing said reference characteristic, and a layer of a continuously tacky adhesive disposed upon a second major surface of said elongate length.

17. The apparatus of claim 16, further comprised of said material and said adhesive being transparent to said light for slightly changing a characteristic of said light.

18. The apparatus of claim 16, further comprised of the media having surface properties contrasting with said indicia of information, and said reference characteristic being comparable to said surface properties.

19. An apparatus for scanning written or printed matter, comprising:

a scanning plate with a reference scanning surface;

a light source for projecting a light beam toward said reference scanning surface;

an adhesive scanning tape comprising a plurality of strips removably attached to said reference scanning surface, each of said strips exhibiting a reference characteristic for affecting said light and formed of elongate lengths of material arranged in a stacked array, each of said elongate lengths of material comprising:

one major surface providing a corresponding reference characteristic, and a layer of a continuously tacky adhesive disposed upon a second major surface of said elongate length; and a passage for transporting media bearing indicia of information between said light source and said adhesive scanning tape.

20. The apparatus of claim 19, comprising:

said reference characteristic influencing reflection of said light beam; and said scanning plate maintaining said strips in a position that is constantly exposed to illumination by said light beam.

* * * * *